Oct. 29, 1946.      D. BLITZ      2,410,006
BALANCED DETECTOR FOR ALTIMETERS
Filed May 30, 1944
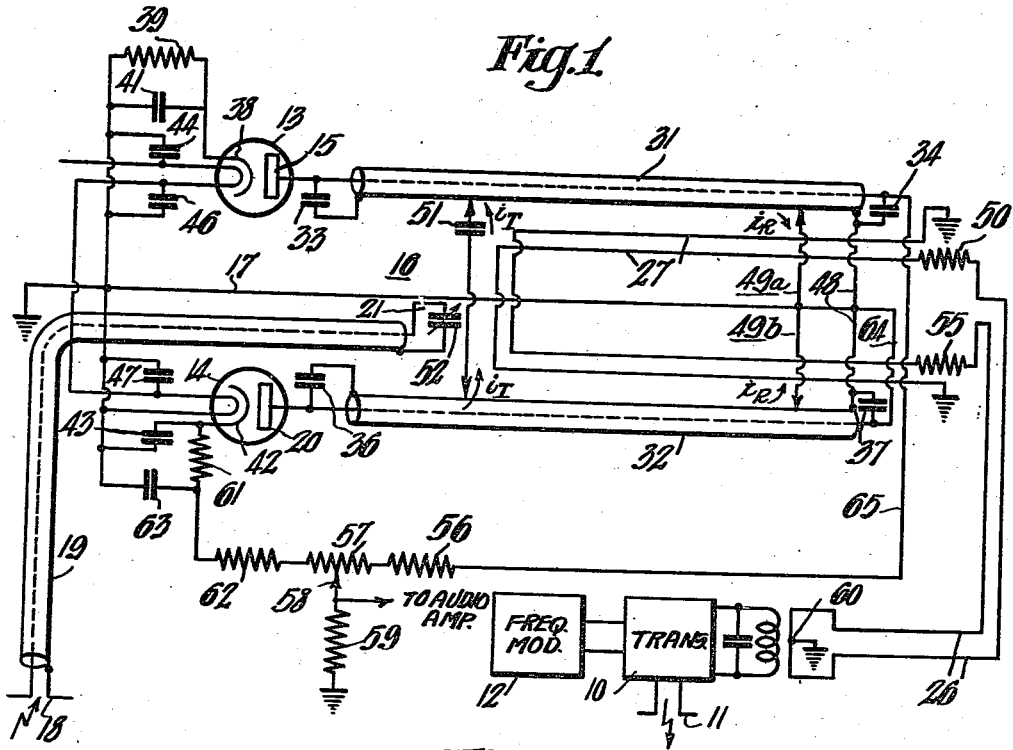
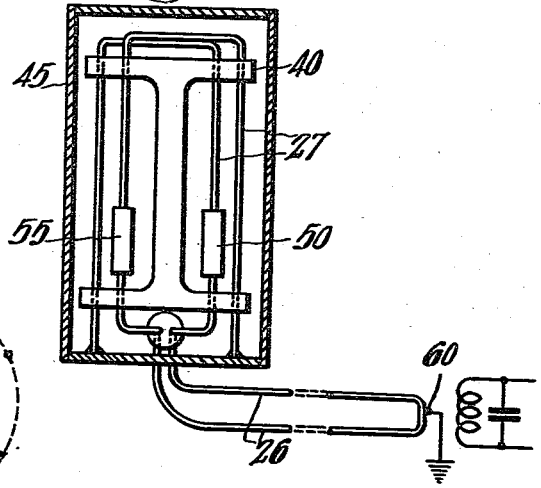
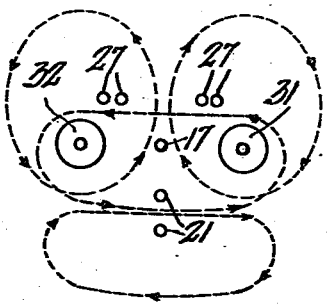
INVENTOR.
Daniel Blitz
BY
ATTORNEY Patented Oct. 29, 1946

2,410,006

UNITED STATES PATENT OFFICE 2,410,006

BALANCED DETECTOR FOR ALTIMETERS

Daniel Blitz, Princeton, N. J., assignor to Radio Corporation of America, a corporation of Delaware Application May 30, 1944, Serial No. 538,052

5 Claims. (Cl. 250—27)

My invention relates to balanced detectors for altimeters or other distance measuring systems of the frequency modulated or FM type.

In application Serial No. 445,720, filed June 4, 1942, in the name of Royden C. Sanders, Jr., entitled Frequency modulated altimeter or distance indicator, there is described a balanced beat frequency detector comprising diodes and a tuned line in which undesired amplitude modulation in an FM altimeter or radar system is balanced out. In any balanced detector that is employed in a system operating on high radio frequencies such as those utilized in radar systems, it is difficult to obtain a perfect balance.

An object of the present invention is to provide an improved detector of the balanced type, and particularly to provide an improved method of and means for coupling to a balanced detector.

A further object of the invention is to provide an improved balanced detector for use in FM distance measuring systems such as altimeters.

A further object of the invention is to provide a detector of the balanced type that can be adjusted to an exact balance with a minimum of difficulty.

A still further object of the invention is to provide an improved coupling means for balanced detectors operating on centimeter wave signals.

In one embodiment, the invention is applied to a balanced diode detector in which each detector tube has the reflected signal and the heterodyning signal applied thereto with the two signals having a phase relation with respect to each other at one tube that is the opposite of their phase relation with respect to each other at the other tube. The reflected signal may be applied to the detector tubes in parallel relation while the heterodyning signal from the transmitter is applied to them in push-pull relation through my improved coupling circuit which comprises a double coupling loop. The output signal may be taken off the anode of one tube and off the cathode of the other tube and the two output signals combined, whereby any amplitude modulation of the applied signals, and particularly of the heterodyning signal, may be balanced out. The heterodyne or difference frequency signal, on the other hand, appears in the detector output circuit. Likewise, any interfering or jamming signal may be balanced out.

The invention will be better understood from the following description taken in connection with the accompanying drawing in which Figure 1 is a circuit and block diagram of an FM altimeter embodying the invention; Figure 2 is a view showing the mechanical arrangement of my double coupling loop employed in the receiver illustrated in Fig. 1; and Figure 3 is a view showing the relative positioning of the coupling loops to the tuned line of Fig. 1. In the several figures, like parts are indicated by the same reference characters.

Referring to Fig. 1, the invention is shown applied to the balanced detector of a radio altimeter. The altimeter comprises a frequency-modulated radio transmitter 10 which radiates a frequency-modulated carrier wave from an antenna 11. Suitable means for sweeping the carrier wave frequency through a certain frequency range periodically is indicated at 12.

The associated receiver includes a balanced detector which comprises a pair of diodes 13 and 14 that have signal applied thereto from a tuned line 16 having a grounded center conductor 17 associated therewith. The reflected signal is picked up by a receiver antenna 18 and is supplied through a coaxial line 19 to a coupling loop 21 which (as shown in Fig. 3) is positioned under the conductor 17 with its plane at right angles to the plane of the tuned line 16. Thus the reflected signal is applied with like polarity to the anodes 15 and 20 of the diodes 13 and 14. Stated differently, it is applied in parallel relation to the diodes.

The same frequency-modulated signal that is supplied to the transmitter antenna 11 is also supplied as a heterodyning signal through either a coaxial or a two-wire line 26 to a coupling loop 27 which is made a double loop for the purpose of improving the circuit balance as explained hereinafter. The double loop 27 is positioned with its plane parallel to the plane of the tuned line 16 and it is centered with respect to the line 16 as illustrated. Thus the heterodyning signal is applied with opposite polarities to the anodes 15 and 20 of the diodes 13 and 14, i. e., it is applied in push-pull relation instead of in parallel relation. The two applied signals produce a difference or beat frequency signal which is a measure of the time required for the signal radiated from antenna 11 to reach antenna 18 by reflection and which is, therefore, a measure of the distance to the reflecting surface.

The tuned line 16 includes two coaxial conductors 31 and 32, the inner conductors of which are connected to the anodes 15 and 20. The outer conductors of the coaxial conductors 31 and 32 are connected at each end to the inner conductor by means of capacitors 33, 34, 36 and 37 whereby the inner and outer conductors are at the same potential at radio frequencies.

The cathode 38 of diode 13 is conductively connected to ground preferably through a low impedance resistor 39 and a capacitor 41 in parallel. The cathode 42 of diode 14 is connected to ground at radio frequencies through a capacitor 43. The cathode 38 may be connected directly to ground, if desired, but the connection through capacitor 41 is preferred since it makes the circuit more symmetrical and more easily balanced. This is true because capacitor 41 at diode 13 corresponds to capacitor 43 at diode 14, the latter capacitor being required where the beat frequency signal is taken off the cathode. The resistor 39 is required to complete the direct-current path for diode 13. It may have a resistance of 100 ohms, for example. Each side of the heater filament for cathode 38 is held at ground potential at radio frequencies by means of bypass capacitors 44 and 46. Also, one side of the heater filament for cathode 42 is held at ground potential at radio frequencies by means of a bypass 47, the other side of the filament being connected directly to ground.

Referring again to the tuned line 16, the ends of the outer conductors of lines 31 and 32 are connected to ground through a connection 48 and the center conductor 17. An adjustable shorting bar 49a, 49b is provided for tuning the two circuits formed by each coaxial line and the center conductor 17 to the mid-frequency of the signal from the receiver antenna 18. It will be seen that there is one resonant circuit that may be traced from the anode 15 through the capacitor 33, the conductor 31, the shorting bar section 49a and the conductor 17 to ground; and a second resonant circuit that may be traced from the anode 20 through the capacitor 36, the conductor 32, the shorting bar section 49b and the conductor 17 to ground.

A third resonant path is provided by a capacitor 51 that is in adjustable contact with the outer conductors of coaxial conductors 31 and 32. This path may be traced from the anode 15 through the capacitor 33, the conductor 31, the capacitor 51, the conductor 32 through capacitor 36 to the anode 20. This third path is made resonant at the mid-frequency of the heterodyning or mixing signal from the transmitter, this mid-frequency being the same, of course, as the mid-frequency of the received reflected signal.

It will be seen that the lines of force from the loop 27 will cut the conductors 31 and 32 as indicated in Fig. 3 whereby the flow of transmitter or mixing signal in tuned circuit 16 will be as indicated by the arrows $i_T$ in Fig. 1. Thus, the mixing signal at the anode 15 is 180 degrees out of phase with the mixing signal at the anode 20. The lines of force from the loop 21 cut the conductors 31 and 32 as shown in Fig. 3 whereby the flow of reflected signal will be as shown by the arrows $i_R$ in Fig. 1. It will be seen that the reflected signal on the anode 15 is in phase with the reflected signal on the anode 20.

The loops 27 and 21 are adjustable parallel to the plane of the lines 31 and 32 to permit balancing adjustments to compensate for any difference in diode characteristics or in the physical construction of the tuned circuit 31—32 or other parts of the receiver. The loop 21 preferably is terminated by a tuning capacitor 52. The double loop 27 may be supported by a block 40 of insulating material as shown in Fig. 2 and covered by a rectangular shielding can 45 that is part of the receiver shielding (not shown). As shown in Figs. 1 and 2, one of the loops 27 is connected through a terminating resistor 50 to one side of the input line 26; the other end of this loop may be connected to ground through the shielding can 45. Likewise, the other of the loops 27 is connected through a terminating resistor 55 to the other side of the line 27; and the other end of this loop is connected to the shielding can 45. If desired, the terminating resistors 50 and 55 may be located adjacent to the ground connections instead of in the locations illustrated.

The transmitter end of the line 26 preferably is grounded at its electrical midpoint 60 for balancing out any electrostatic pickup from the transmitter because any signal thus picked up and supplied to the detector will be in the wrong phase and will unbalance the detector. However, grounding the transmitter end of the line 26 does not always eliminate signal due to capacity pick-up for the reason that the grounded point 60 is not always exact as to location. Any such pick-up current may have different values in the two sides of the line 26. It is because of this that the double loop 27 is employed. It will be apparent that the coupling to the tuned line 31, 32 from any part of the double loop 27 will include both leads of the line 26 and any current difference will be averaged out.

Referring now to the detector output circuit, it will be seen that the beat frequency signal is taken off the anode 15 through the inner conductor of the coaxial line 31 and supplied through a conductor 65, a resistor 56 and a portion of a resistor 57 to a variable tap 58 and an output resistor 59. The beat frequency signal also is taken off the cathode 42 through a low impedance filter resistor 61 (having a resistance of 100 ohms, for example) and supplied through a resistor 62 and the other portion of resistor 57 to the variable tap 58 and the output resistor 59. A filter capacitor 63 is connected between ground and the end of filter resistor 61 remote from the cathode. The resistor 61 and the capacitor 63 are provided to keep the radio frequency out of the output circuit. The beat or audio frequency circuit for diode 14 is completed from the anode 20, through the inner conductor of coaxial line 32 and through a connection 64 to the grounded conductor 17.

From the foregoing, it will be evident that any amplitude modulation may be balanced out by adjusting the tap 58 since this modulation at one anode is in phase with that at the other anode. The beat frequency signal, on the other hand, is 180 degrees out of phase at one anode with respect to the beat frequency signal at the other anode whereby these signals add due to phase reversal obtained by the output connections.

It may be noted, merely by way of example, that all the capacitors shown in Fig. 1, except the tuning capacitor 52, have a capacity of 55 micro-microfarads. Also, resistors 56 and 62 may be 5000 ohms each, resistor 57 may be 25,000 ohms and resistor 59 may be 47,000 ohms. These values are for a receiver operating at a 440 megacycle carrier frequency that is being swept through a range of 40 megacycles.

It should be understood that the mixing signal and the reflected signal may be applied to the detector in parallel relation and push-pull relation, respectively, if desired instead of in the opposite way described above.

I claim as my invention:

1. In combination, a balanced circuit comprising a tuned line, a two-wire line for supplying signal from a signal source to said tuned line, said two-wire line being grounded adjacent to said signal source at substantially the electrical midpoint of said two-wire line, and means for coupling said two-wire line to said tuned line, said means comprising a double inductive loop coupled to said tuned line, said double loop having two sides that are adjacent to the two conductors, respectively, of said tuned line, the midpoint of said double loop being grounded whereby each side of said double loop includes conductors that carry the current flow of each of the conductors of said two-wire line so that any coupling due to unequal current flow in opposite sides of said two-wire line is balanced out.

2. In combination, a balanced detector comprising a tuned line and a pair of rectifiers coupled to opposite sides, respectively, of said line, a two-wire line for supplying signal from a signal source to said tuned line, said two-wire line being grounded adjacent to said signal source at substantially the balance point of said two-wire line, and means for coupling said two-wire line to said tuned line, said means comprising a double inductive loop coupled to said tuned line, said double loop having two sides that are adjacent to the two conductors, respectively, of said tuned line, the midpoint of said double loop being grounded whereby each side of said double loop includes conductors that carry the current flow of each of the conductors of said two-wire line so that any coupling due to misplacement of said grounded point of the two-wire line is balanced out.

3. In combination, a balanced circuit comprising a tuned line, a signal source, a two-wire line for supplying signal from said signal source to said tuned line, said two-wire line being inductively coupled to said signal source through a coupling loop which is grounded at substantially its balance point, and means for coupling said two-wire line to said tuned line, said means comprising a double inductive loop coupled to said tuned line, said double loop having two sides that are adjacent to the two conductors, respectively, of said tuned line, the midpoint of said double loop being grounded whereby each side of said double loop includes conductors that carry the current flow of each of the conductors of said two-wire line so that any coupling due to misplacement of said grounded point of the two-wire line is balanced out.

4. A balanced detector comprising a tuned line having an electrical midpoint, a pair of rectifiers coupled, respectively, between said midpoint and opposite sides of said line, a multiple turn coupling loop coupled to said tuned line, a pair of conductors for supplying signal to said multiple turn coupling loop, said conductors being inductively coupled through a coupling loop portion to a signal source, said conductors being connected to ground at a balance point on said coupling loop portion, said multiple turn coupling loop having two sides that are adjacent to the two conductors, respectively, of said tuned line, each side of said multiple turn loop including a pair of wires carrying the current of each of said conductors, respectively, of said pair.

5. In a frequency-modulated radar system, a balanced detector comprising a tuned line having an electrical midpoint, a pair of rectifiers coupled, respectively, between said midpoint and opposite sides of said line, a double loop coupled to said tuned line, a pair of conductors for supplying signal to said double coupling loop, said conductors being inductively coupled through a coupling loop portion to a signal source, said conductors being connected to ground at a balance point on said coupling loop portion, said double coupling loop having two sides that are adjacent to the two conductors, respectively, of said tuned line, each side of said double loop including one of said conductors of said pair whereby differences in current flow in the conductors of said pair are averaged out.

DANIEL BLITZ.